US011988038B2

(12) United States Patent
Gibbs, Jr. et al.

(10) Patent No.: US 11,988,038 B2
(45) Date of Patent: May 21, 2024

(54) WINDOW SCREEN WITH MAGNETIC CORNER KEYS AND ASSOCIATED CORNER KEY MATES

(71) Applicant: Ply Gem Industries, Inc., Cary, NC (US)

(72) Inventors: Kenton Sites Gibbs, Jr., Rocky Mount, VA (US); Daniel Lee Rider, Wirtz, VA (US)

(73) Assignee: Ply Gem Industries, Inc., Cary, NC (US)

( * ) Notice: Subject to any disclaimer, the term of this patent is extended or adjusted under 35 U.S.C. 154(b) by 115 days.

(21) Appl. No.: 17/658,721

(22) Filed: Apr. 11, 2022

(65) Prior Publication Data

US 2023/0323733 A1 Oct. 12, 2023

(51) Int. Cl.
*E06B 9/52* (2006.01)

(52) U.S. Cl.
CPC .......... *E06B 9/52* (2013.01); *E06B 2009/527* (2013.01)

(58) Field of Classification Search
CPC ............................. E06B 9/52; E06B 2009/527
See application file for complete search history.

(56) References Cited

U.S. PATENT DOCUMENTS

| | | | | | |
|---|---|---|---|---|---|
| 1,453,280 | A * | 5/1923 | Park | E06B 9/52 49/431 |
| 2,436,277 | A * | 2/1948 | Willett | E06B 9/52 160/369 |
| 2,494,844 | A * | 1/1950 | Tondora | E06B 9/52 160/92 |
| 2,598,770 | A * | 6/1952 | Drozt | B60J 1/2011 160/105 |
| 2,604,156 | A * | 7/1952 | Lillethorup | E06B 9/52 160/92 |
| 6,108,997 | A * | 8/2000 | Blais | E06B 3/9645 52/656.1 |
| 8,028,489 | B1 * | 10/2011 | Lawrence | E06B 3/9641 52/204.58 |
| 8,966,839 | B2 * | 3/2015 | Rebman | E06B 3/263 52/203 |
| 9,234,388 | B2 * | 1/2016 | Altieri, Jr. | E06B 9/522 |
| 9,587,427 | B2 * | 3/2017 | Webb | E06B 9/02 |
| 11,149,491 | B1 * | 10/2021 | Ulsh | E06B 3/96 |

(Continued)

*Primary Examiner* — Beth A Stephan
(74) *Attorney, Agent, or Firm* — Lathrop GPM LLP; Robert J. Lambrechts

(57) ABSTRACT

A magnetically attachable window screen for attachment to a window frame. The window screen includes a plurality of screen frame members. Each frame member includes a first end and a second end wherein the first and second ends are operable to receive a flange member. The window screen also includes a screen corner key with a central magnetic member and two orthogonally opposed flanges extending outwardly in a single plane from the central magnetic member. The flange members of the screen corner key are inserted into the first and second ends of orthogonally opposed adjacent screen frame members to form a fully assembled screen frame. The window screen also includes a plurality of corner key mates inserted into each corner of the screen channel of the window frame. The central magnetic member of the inserted corner key is operable for magnetic attraction to respective corner key mates.

21 Claims, 10 Drawing Sheets

(56) References Cited

U.S. PATENT DOCUMENTS

| | | | | |
|---|---|---|---|---|
| 2016/0090780 | A1* | 3/2016 | Altieri, Jr. | E06B 9/0692<br>29/426.6 |
| 2020/0263463 | A1* | 8/2020 | Woodward | E06B 3/36 |
| 2021/0102427 | A1* | 4/2021 | Karolevitz | B60J 1/2011 |
| 2021/0246721 | A1* | 8/2021 | Fan | E06B 9/44 |
| 2022/0056760 | A1* | 2/2022 | Altieri, Jr. | E06B 9/52 |
| 2022/0183482 | A1* | 6/2022 | Büdenbender | A47G 1/101 |
| 2023/0203880 | A1* | 6/2023 | Büdenbender | E06B 9/522<br>160/374 |

* cited by examiner

WINDOW SCREEN WITH MAGNETIC CORNER KEYS AND ASSOCIATED CORNER KEY MATES

FIELD OF THE DISCLOSURE

This disclosure pertains to a kit and system for mounting window screens. Specifically, this disclosure details a kit and system for magnetically attaching window screens to windows.

BACKGROUND

Windows currently used in the construction of new residential dwellings, and as an aftermarket product in renovations, typically contain a window frame of extruded plastic or the like. To reduce the weight of the window frame, and the cost of material, single hung, double hung and casement window frames are typically constructed with a plurality of interior walls resulting in a plurality of channels which typically run longitudinally along the entire length of each piece of the straight window frame.

To attach a window screen to a window, the walls of the window frame against which the window screen is to be mounted are typically provided with a slot in the window frame sides bounding the sides of the window screen to be installed in the window frame. These slots typically open into an internal channel within each side of the window frame, the slots and underlying channels being intended to receive retention pins mounted in the window screen. The window screen typically contains biasing means, such as leaf springs, for biasing the retention pins into the window frame through the slot and into the underlying channel.

Unfortunately, the use of retention pins is an awkward way to install and uninstall window screens from any window. Retention pins biasing means are typically concealed within the window screen and it is difficult to determine precisely where the retention pins are positioned in that the position of retention pins is typically not visible once the window screens have been installed in a casement window. When attempting to pull a window screen directly forward to remove the window screen, the pins are often not released sufficiently by the biasing means to permit the screens to be removed without some guess work.

To avoid any concern as to if the posts or other internal parts of the window screen will be broken by forcefully pulling the window screen away from a casement window frame, a user often resorts to flexing the typical aluminum sides of the window screen at various locations to obtain the necessary clearance to remove the window screen without exerting excessive force. Several attempts may be required to determine precisely where the retaining posts are and where the window screen sides need to be flexed. Often users are unable to remove the window screens and help is sought by the user.

SUMMARY OF THE INVENTION

Currently, most window screens utilize pull pins and/or leaf springs to hold a window screen in position within the window frame. These pull pins and leaf springs can be challenging, possibly even frustrating, to operate. The pull pins that are spring loaded can malfunction and the leaf springs can lose their spring effect and become essentially inoperable to hold the window screen in place.

Disclosed herein is a magnetically attachable window screen for attachment to a window frame. The window screen includes a plurality of screen frame members, each frame member having a first end and a second end. The first and second ends are operable to receive a flange member form a screen corner key. The screen corner key includes a central magnetic member and two orthogonally opposed flanges that extend outwardly in a single plane from the central magnetic member.

The disclosed system also includes a corner key mate for insertion into a corner of a screen channel of the window frame. The flange members of the screen corner key are inserted into the first and second ends of orthogonally opposed adjacent screen frame members, that are typically and preferably thin walled, to form a fully assembled screen frame. The central magnetic member of the inserted corner key relies upon magnetic attraction to respective corner key mates that are installed in the screen channel of the window frame. In a typical single hung, double hung or casement window there will typically be four screen frame members. Each of the corner key mates are inserted into the screen frame members and serve to provide a means of securing the four screen frame members to one another with a powerful magnet disposed at each corner and tightly held in position.

An object of the present invention is to provide an apparatus and method for removably attaching a window screen that is easy to install.

Another object is to a provide a screen attachment apparatus that can be used with any shape of screen.

A further object is to provide a screen attachment apparatus that is self-aligning when the screen is being installed.

Other objects of the present invention will become apparent in-light-of the following drawings and detailed description of the invention.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered relating to the drawing figures, wherein like numerals denote like elements.

DETAILED DESCRIPTION

The detailed description of exemplary embodiments herein refers to the accompanying drawings, which show exemplary embodiments by way of illustration and their best mode. While these exemplary embodiments are described in sufficient detail to enable those skilled in the art to practice the inventions, other embodiments may be realized and that logical, chemical, and mechanical changes may be made without departing from the spirit and scope of the inventions.

The detailed description herein is presented for purposes of illustration only and not of limitation. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
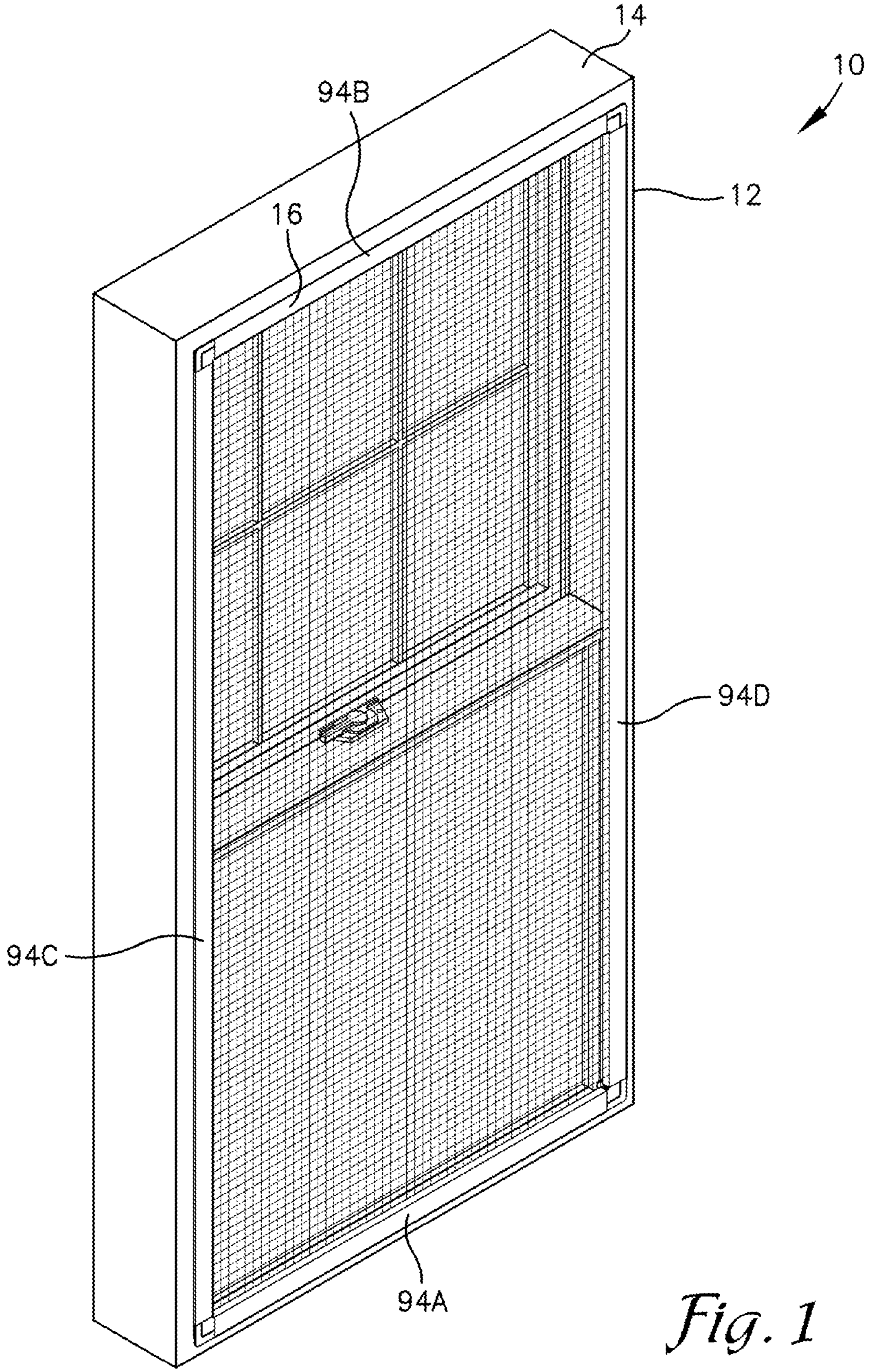
FIG. 1 illustrates a perspective view of a standard double hung window with the magnetically attachable window screen system as disclosed herein.

Illustrated at FIG. 1 is a standard double hung window as well as an installed embodiment of the magnetically attachable window screen system 10 disclosed herein. The system 10 as disclosed includes a window 12. The window 12 further includes a window frame 14 for removably attaching a window screen 16 thereto with the system 10 as disclosed herein. The window frame 14 includes four window frame sides to include a lower horizontal frame side 18A, an upper horizontal frame side 18B and two opposing vertical frame sides 18C, 18D.

Each window frame side 18A-18D includes a screen channel 20 extending the entire inner perimeter of the window frame 14. It is within this channel 20 that a window screen typically resides in a window frame 14. The width of the screen channel 20 may vary among window frame manufacturers; however, the components utilized in the system 10 disclosed herein may be fabricated for utilization in any width of screen channel 20.

The system 10 as disclosed utilizes a corner key mate 22 fitted into each corner of the screen channel 20. The corner key mate 22 is fabricated from a steel plate that is encapsulated in an injection molded engineered polymer to prevent oxidation of the steel from exposure to moisture.

Figure 2:
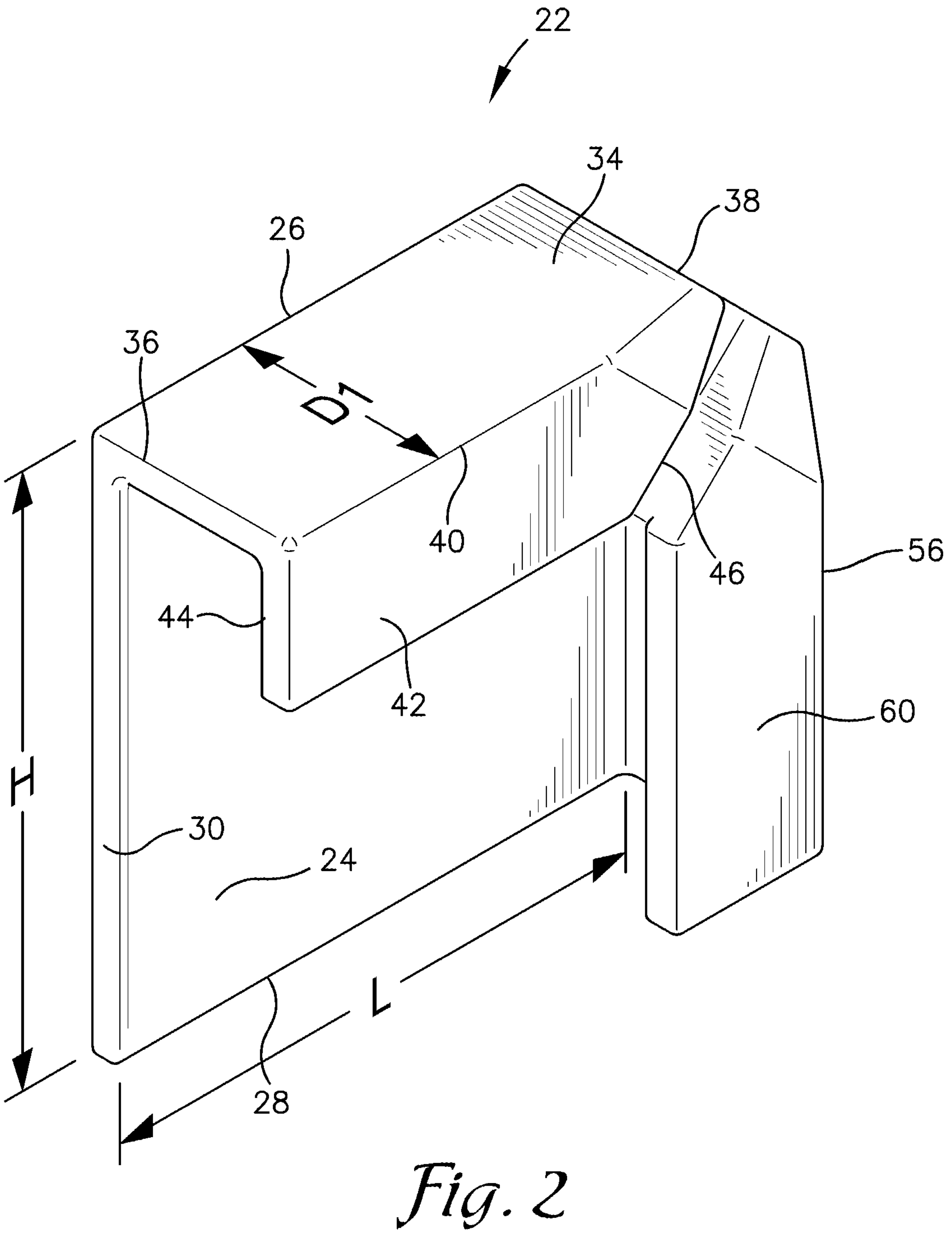
FIG. 2 illustrates a perspective view of a corner key mate.
Figure 3:
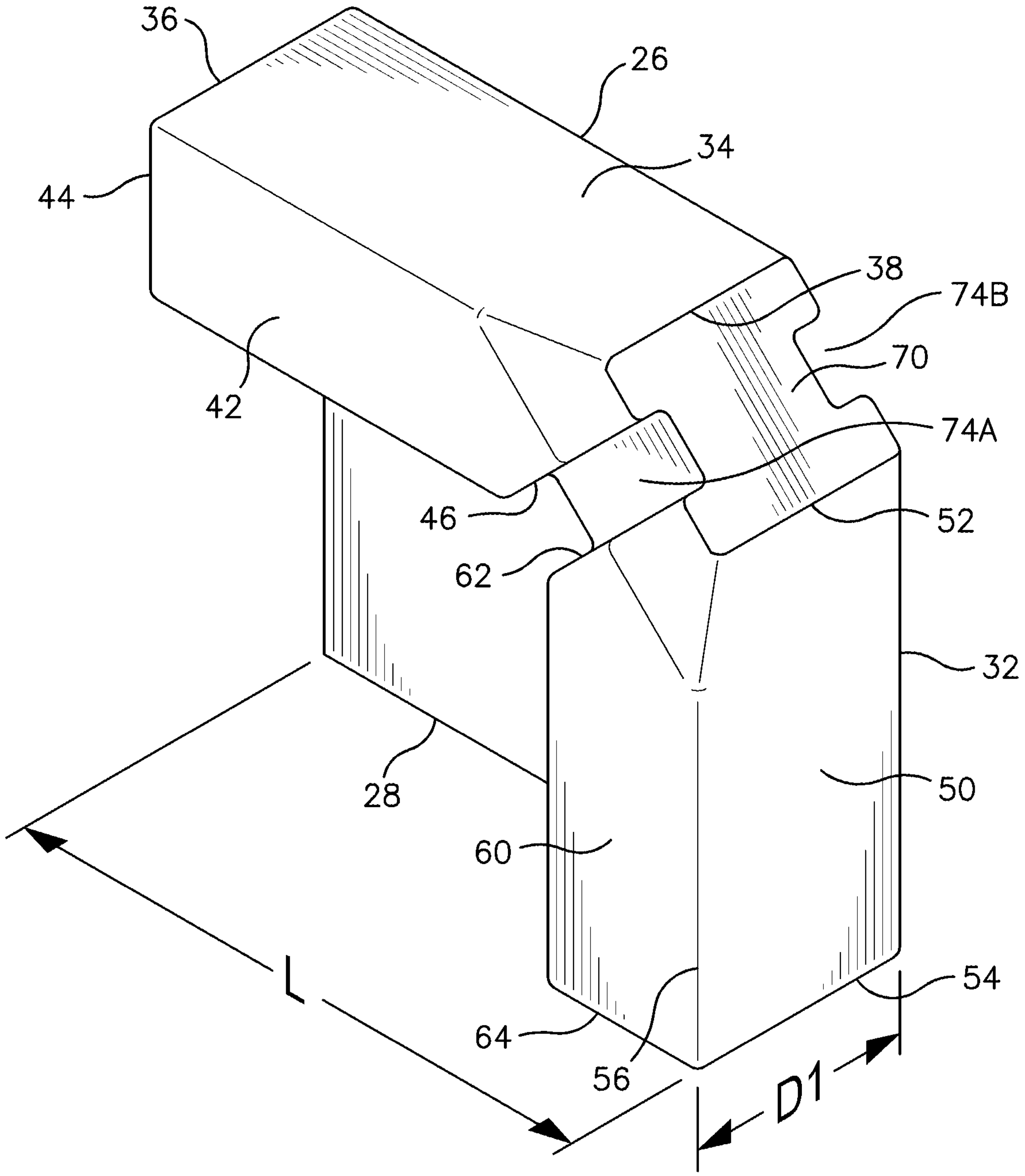
FIG. 3 illustrates an alternative perspective view of the corner key mate.

As seen in FIGS. 2 and 3, the corner key mate 22 includes a back wall 24 with a height H, a length L, an upper edge 26, a lower edge 28 and first and second side edges 30, 32. The corner key mate 22 also includes an overhanging upper wall 34 with opposed first and second laterally extending side edges 36, 38. The overhanging upper wall 34 extends perpendicularly outwardly a distance D1 from the upper edge 26 of the back wall 24. This distance D1 is critical as it is roughly the width of the screen channel 20 discussed above.

Having a distance D1 that is closely aligned with the width of the screen channel 20 facilitates a secure fit of the corner key mate 22 into the screen channel when manually installed. The overhanging upper wall 34 terminates at a first outer edge 40 with the second side edge 38 of the overhanging upper wall 34 terminating prior to the second side edge 32 of the back wall 24. The first side edge 36 of the overhanging upper wall 34 begins at the first side edge 30 of the back wall 24.

FIGS. 2 and 3 also reveal that the corner key mate 22 includes a first flange 42 with opposed first and second laterally extending side edges 44, 46. The first flange 42 extends downward perpendicularly from the first outer edge 40 of the overhanging upper wall 34 and spans between the opposed first laterally extending side edge 36 and proximate the second laterally extending side edge 38 of the overhanging upper wall 34. The first flange 42 extends downwardly a distance of at least 0.1 H.

As further illustrated in FIGS. 2 and 3, the corner key mate 22 also includes a side wall 50 extending perpendicularly outwardly a distance of D1 from the second side edge 32 of the back wall 24 with opposed first and second laterally extending edges 52, 54 and terminating at an outbound edge 56. As discussed above, the distance D1 that the side wall 50 extends is significant for purposes of obtaining a tight fit of the corner key mate 22 into the screen channel 20. The first laterally extending edge 52 of the side wall 50 terminates prior to the upper edge 26 of the back wall 24.

Figure 4:
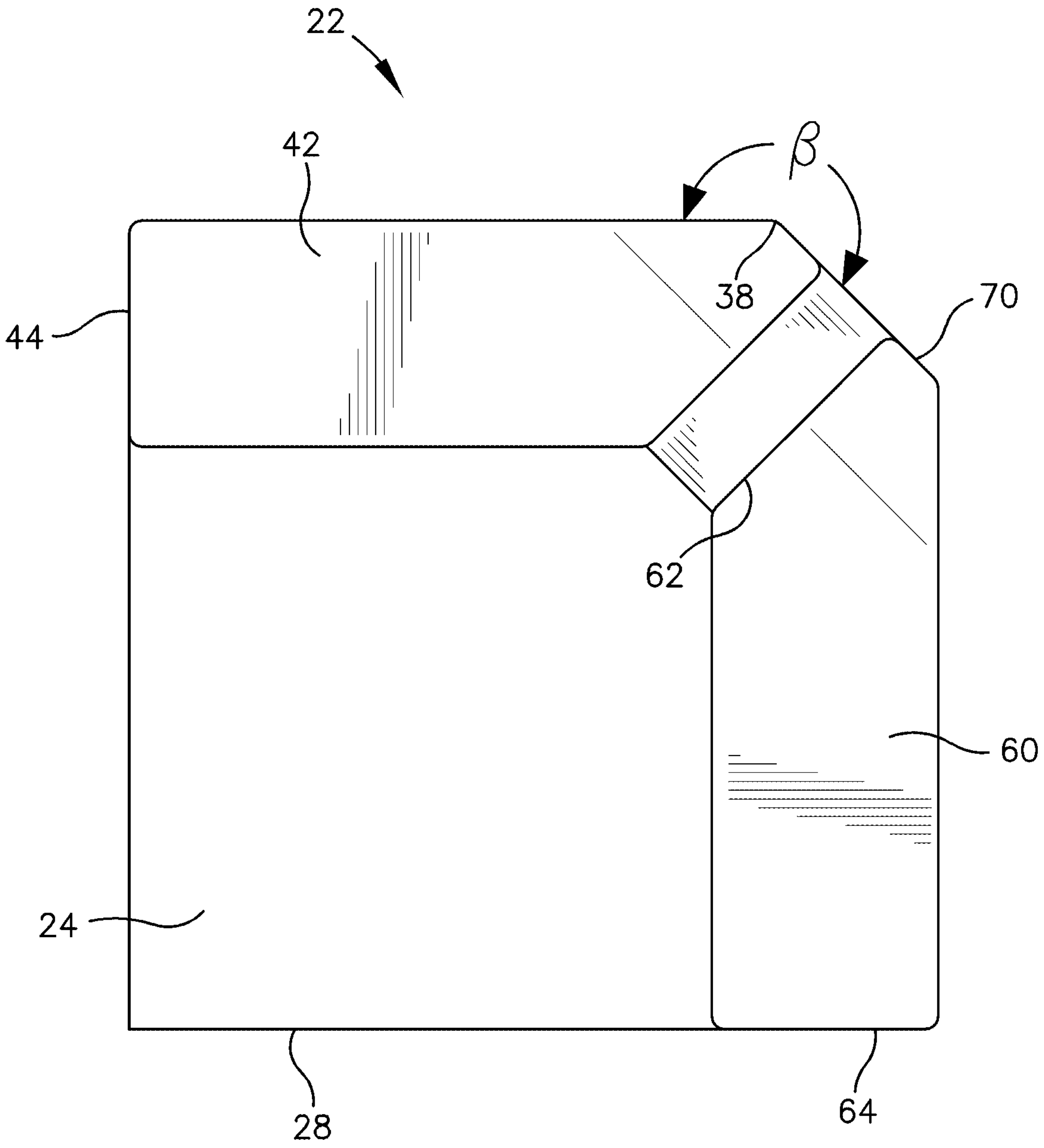
FIG. 4 illustrates a side elevation view of the corner key mate.

The corner key mate 22 includes a second flange 60 with first and second opposed laterally extending edges 62, 64. As illustrated in FIGS. 2 and 3, the second flange 60 extends outward perpendicularly from the outbound edge 56 of the back wall 24. The lateral extent of the second flange 60 is at least 0.1 L. As illustrated in FIGS. 3 and 4, the corner key mate 22 also includes a spanning member 70 between the second laterally extending side edge 38 of the overhanging upper wall 34 and the first laterally extending edge 52 of the side wall 50 forming an angle β in the range of 120 to 150 degrees between the spanning member 70 and the second laterally extending side edge 38 of the overhanging upper wall 34. A preferred β is about 135 degrees. The second laterally extending side edge 38 of the first flange 42 and the first laterally extending edge 62 of the second flange 60 comprise angles of approximately 45 degrees relative to their respective opposed side edges 44, 64.

Figure 5:
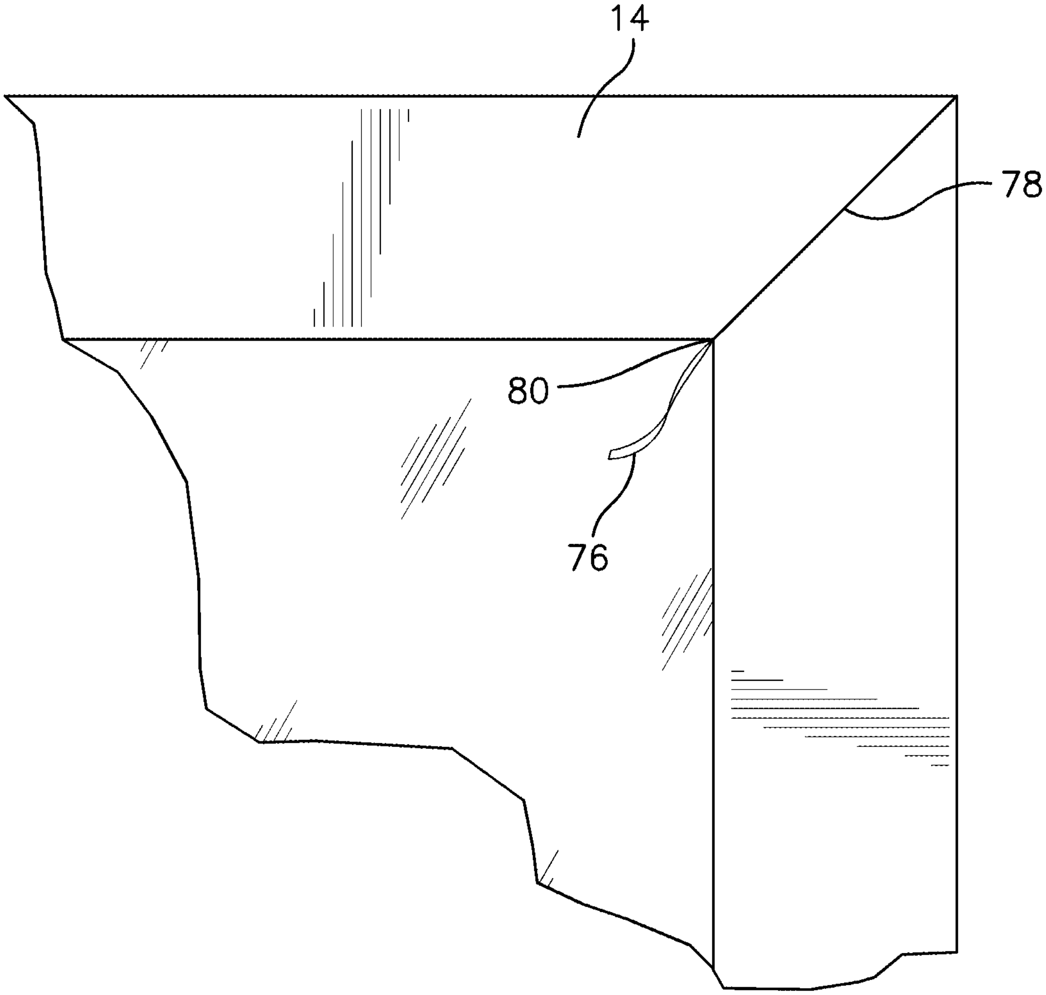
FIG. 5 illustrates a front elevation view of an embodiment of a corner of a window frame.

As illustrated at FIG. 3, the corner key mate 22 includes weld flash relief gaps 74A, 74B between a second lateral edge 46 of the first flange 42 and the first lateral edge 62 of the second flange 60. The weld flash relief gaps 74A, 74B are specifically included in the design of the corner key mate 22 to accommodate any engineered polymer flashing 76, as best illustrated at FIG. 5, that remains at the corner joint 78 following assembly of the members of the window frame 14.

Without the weld flash relief gaps 74A, 74B the flanges 42, 60 of the corner key mate 22, which are instrumental in tightly maintaining the corner key mate 22 within the screen channel 20, would interfere with some percentage of window frames 14 that have not been fully de-flashed. The remaining undesirable corner joint flashing 76 is received into one of the weld flash relief gaps 74A, 74B and does not interfere with full insertion of the corner key mate 22 into the corner 80 of the window frame 14. Additionally, flashing 76 may also reside in the diagonal space created between spanning member 70 of the installed corner key mate 22 and the window frame sides 18A-D.

Figure 6:
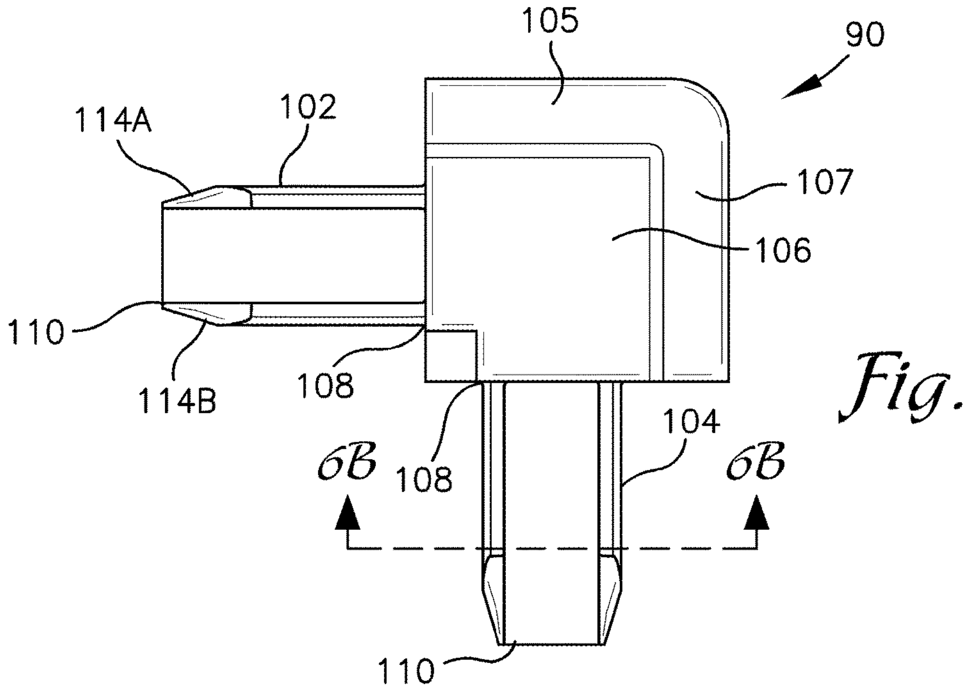
FIG. 6 illustrates a front elevation view of an embodiment of a screen corner key.
Figure 7:
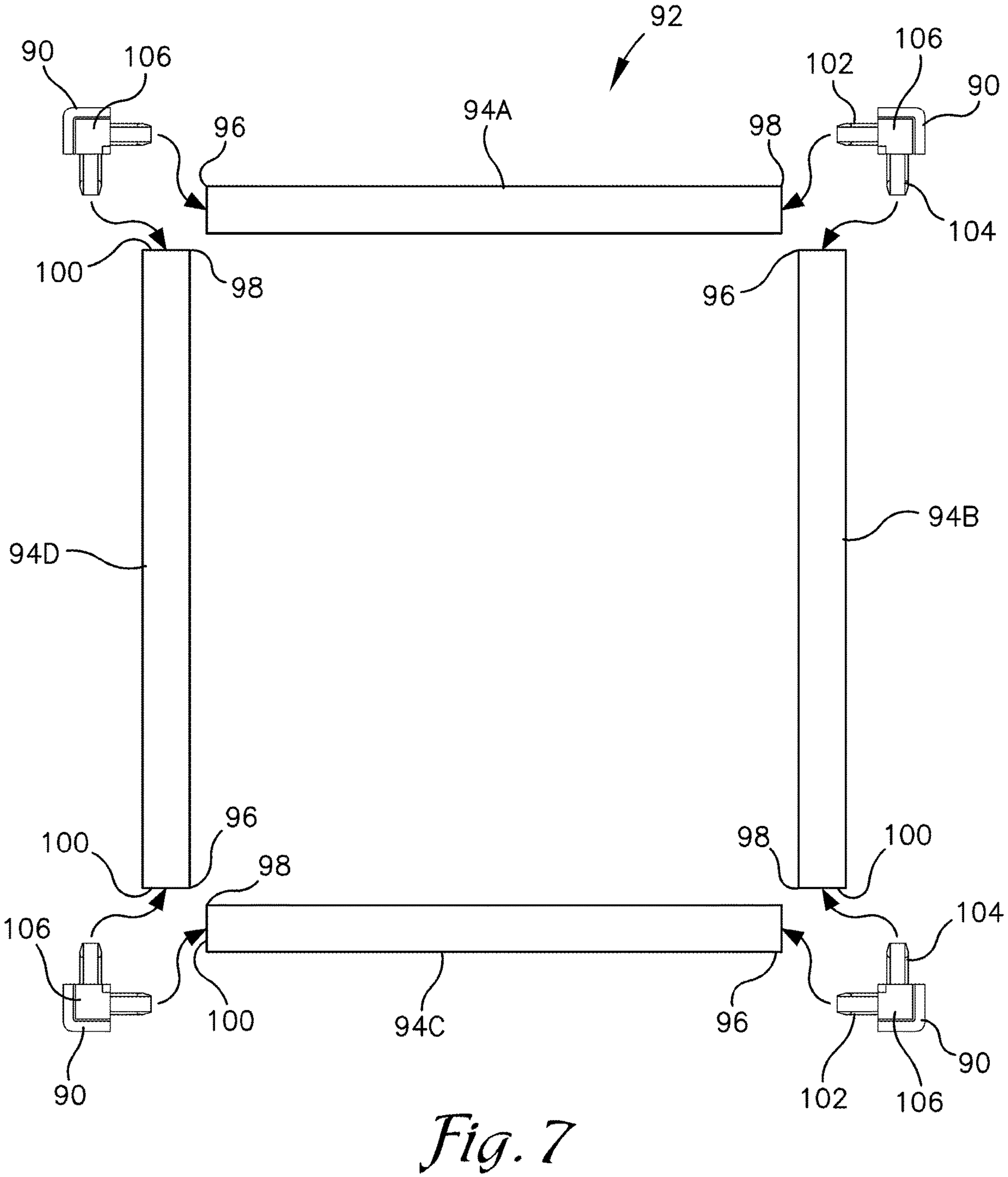
FIG. 7 illustrates an exploded view of an embodiment of a window screen to include screen frame members and screen corner keys.

The second component of the disclosed system is a screen corner key 90 as illustrated at FIG. 6. The screen corner key 90 is used in the assembly of the screen frame 92 as best illustrated at FIG. 7. The standard screen frame 92 is further comprised of a plurality of thin-walled screen frame members 94A, 94B, 94C, 94D each with a first end 96, a second end 98 and an open channel 100 therein. The first end 96 of each screen frame member 94A, 94B, 94C and 94D connected to the second end 98 of an adjacent screen frame member.

Figure 6A:
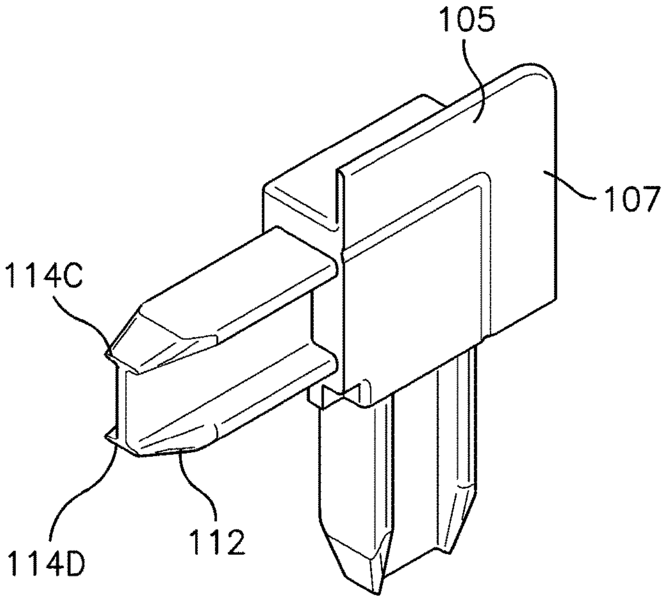
FIG. 6A illustrates a perspective view of an embodiment of the screen corner key.
Figure 6B:
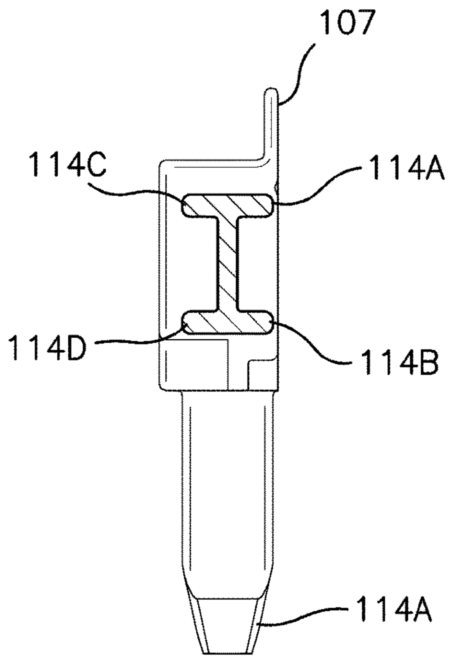
FIG. 6B illustrates a side elevation view of an embodiment of the screen corner key.

As illustrated at FIG. 6, the screen corner key 90 includes orthogonally opposed flanges 102, 104 extending outwardly within a single plane from a central magnetic member 106. The central magnetic member 106 is preferably encapsulated within an engineered polymer to prevent oxidation of the magnetic member 106. The orthogonally opposed flanges 102, 104 each include a proximal end 108 nearest the central magnetic member 106 and a distal end 110. Both flanges 102, 104 are preferably I-shaped in cross-section and include a chamfer 112 on all four sections 114A-114D of the I-shaped distal end 110 as illustrated at FIGS. 6, 6A and 6B. The distal ends 110 of both flanges 102, 104 include a chamfer 112 to facilitate manual entry of the distal end 110 into the first and second ends 96, 98 of the thin-walled screen frame members 94A, 94B, 94C, 94D as illustrated at FIG. 7.

Figure 6C:
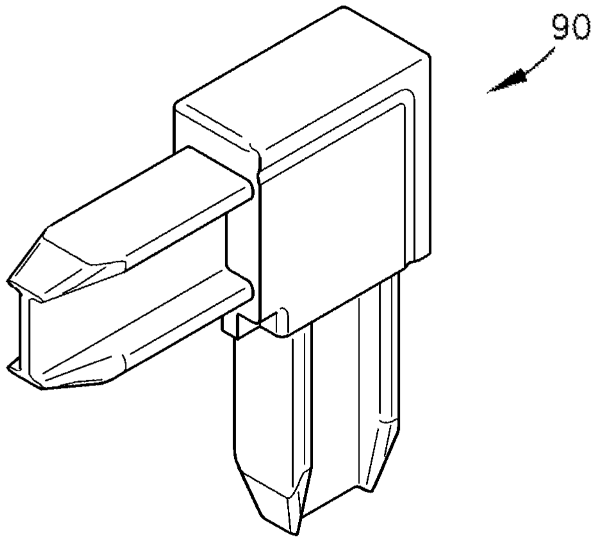
FIG. 6C illustrates a perspective view of an embodiment of the screen corner key.
Figure 6D:
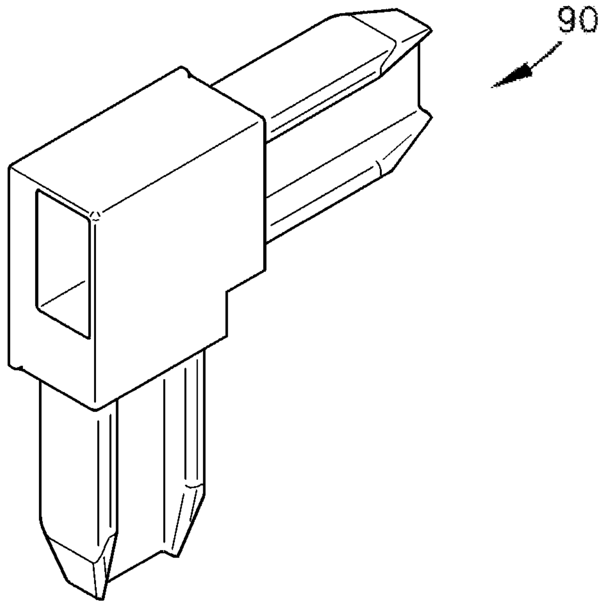
FIG. 6D illustrates a side elevation view of an embodiment of the screen corner key.

FIGS. 6C and 6D illustrate another embodiment of the screen corner key 90 without upper and side barrier walls 105, 107 as seen in FIGS. 6, 6A and 6B.

The chamfer 112 helps to guide the distal end 110 of the flanges 102, 104 into the open channel 100 of the first and second ends 96, 98 of the thin-walled screen frame members and minimize interference with the thin walls of the frame members 94A-94D during entry into the open channel 100 of the frame members. As previously noted, the flanges 102, 104 are orthogonally opposed, and in the same plane, thereby allowing connection of two orthogonally opposed thin-walled screen frame members. When four screen corner keys 90 are utilized all four of the screen frame members 94A-94D can be joined together to yield a fully assembled screen frame 92.

The central magnetic member 106 of each screen corner key 90 is preferably comprised of a neodymium alloy. Neodymium magnets are the strongest permanent magnets commercially available. They provide unparalleled levels of magnetism and resistance to de-magnetization when compared to ferrite, alnico and even samarium-cobalt magnets. Neodymium magnets are strong permanent magnets made from an alloy of neodymium, iron and boron. Part of the Rare-Earth magnet family, they have the highest magnetic properties of all permanent magnets. Due to their high magnetic strength and relatively low-cost, they are the preferred choice for many consumer, commercial, industrial and technical applications.

Operation of the screen system 10 begins with the placement of the corner key mates 22 into the screen channel 20. In a typical square or rectangular single hung, double hung or casement window frame 14 there is a screen channel 20 of a width D1. The width D1 can vary by manufacturer and therefore the width D1 of the disclosed corner key mate 22 can be fabricated in a wide range of widths. Four of the corner key mates 22 are installed into each of the orthogonally opposed screen channels 20 at the corners 80 of the window frame 14.

It is contemplated by that this disclosure that a screen having more than four corners will require that additional corner key mates 22 be employed. Specifically, the overhanging upper wall 34 and the side wall 50 are pressed to the bottom of the screen channel 20 because the width D1 of the upper wall 34 and the side wall 50 are specified to provide a slight interference fit within the screen channel 20.

As previously detailed, the corner key mate 22 is coated with an engineered polymer to prevent oxidation of the metal, preferably steel, from which the corner key mate is fabricated. The corner key mate 22 must be fabricated to allow some additional thickness at D1 to include the thickness of the engineered polymer coating.

Once the corner key mates 22 are installed within the screen channel 20 of the corners 80 of the window frame 14, the next step is the attachment of the fully assembled screen frame 92. As previously discussed, each screen frame 92 is fabricated from thin-walled screen frame members 94A-94D. The thin-walled screen frame members are preferably fabricated from metal such as aluminum, or alternatively, an engineered polymer. At each end of the thin-walled screen frame members 94A-94D the chamfered distal end 110, 112 one of the flange members 102, 104 of the screen corner key 90 is inserted therein and secured in position with a tight friction fit. The orthogonally opposed flange member of the first, and successive, screen corner keys 90 are inserted into the end 96, 98 of an adjacent screen frame member 94A-94D.

Figure 8:
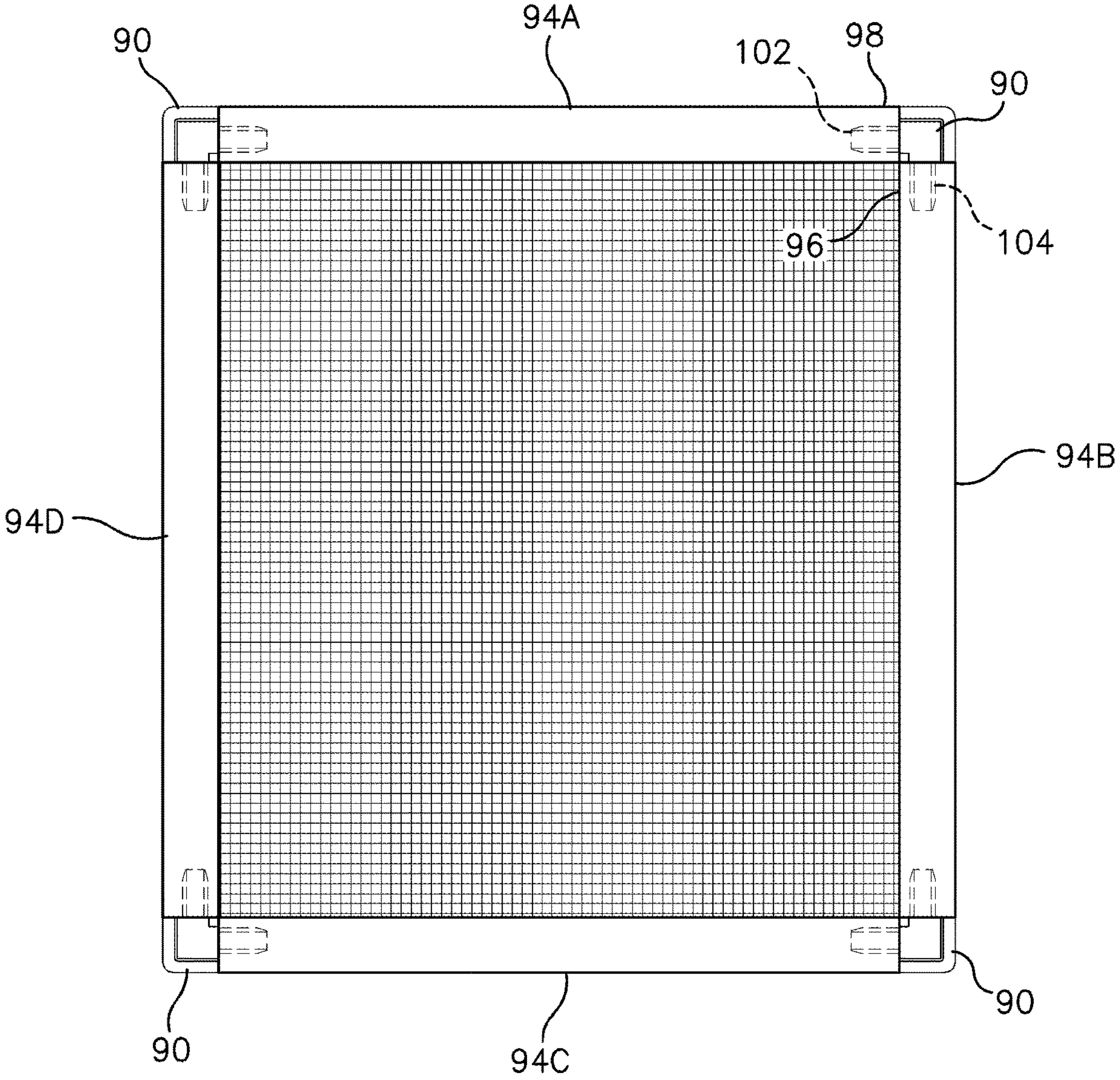
FIG. 8 illustrates a front elevation view of an assembled frame screen with screen corner keys inserted into the ends of the screen frame members.
Figure 9:
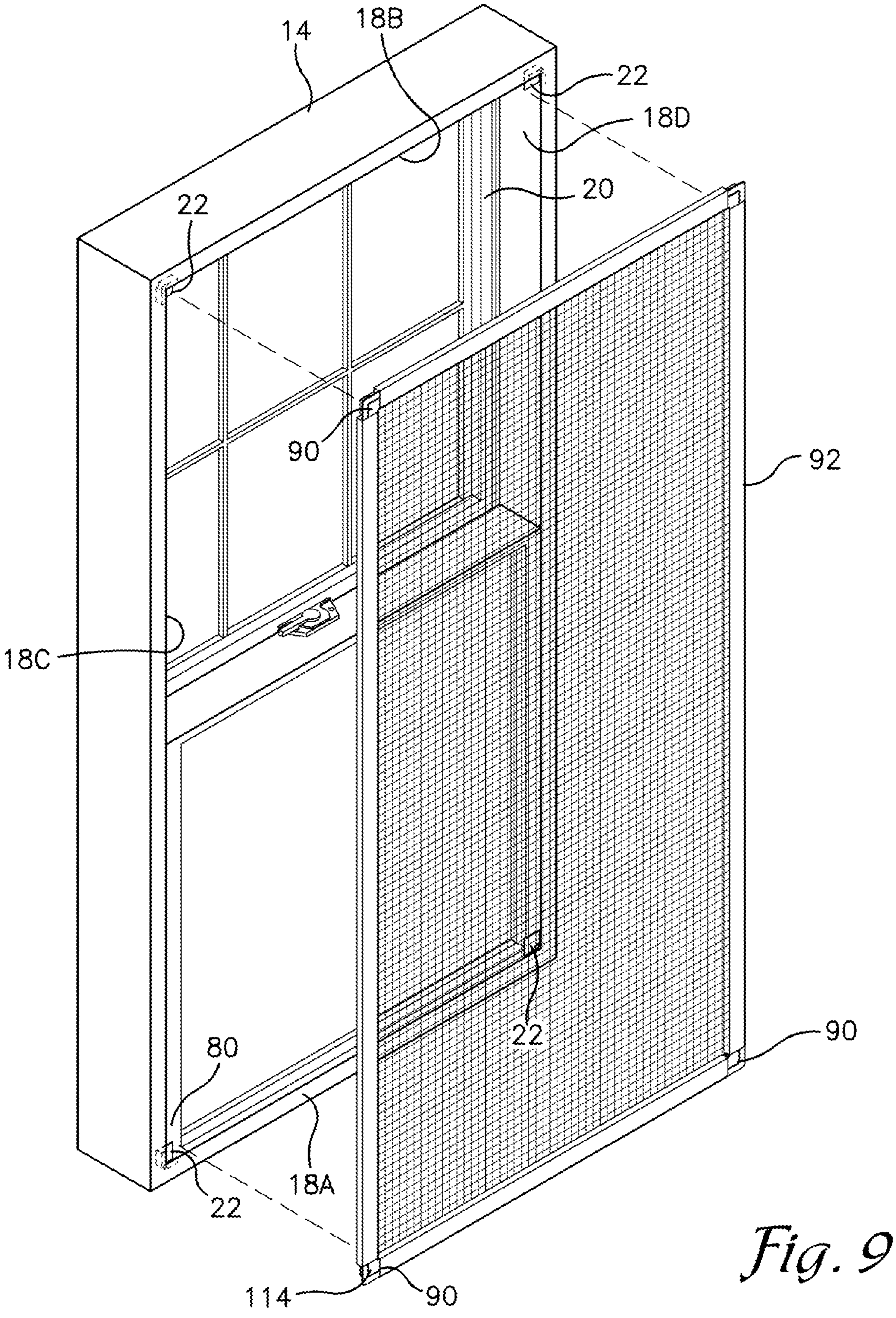
FIG. 9 illustrates an assembly view of an embodiment of the magnetic window screen system as disclosed herein.

As seen in FIGS. 8 and 9, the magnetic screen corner key 90 assembled into each corner 114 of the window screen 92 are attracted to the corner key mate 22 positioned within each corner 80 (see FIG. 5) of the window frame 14. Once the magnetic screen corner key 90 is moved close enough to the corner key mate 22, as seen in FIG. 9, magnetic attraction pulls the screen corner key 90 directly to the corresponding corner key mate 22 and secures the window screen tightly into position on the window frame 14. The magnetic attraction can be overcome with sufficient force should an occupant of the room need to egress the building to escape, for example because of a fire. The occupant need only exert modest force against the window screen 92 and the screen will detach allowing egress to occur.

The disclosed apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variation are possible. Equivalent changes, modifications and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or becomes more pronounced are not to be considered as critical, required, or essential features or elements of any or all the claims of the at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Apparatus are provided herein. In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A kit for a magnetically attaching a window screen to a window frame, the kit comprising:

a plurality of screen corner keys each with a central magnetic member and two orthogonally opposed flanges extending outwardly from the central magnetic member; and a plurality of corner key mates for insertion into a screen channel of the window frame, the corner key mates each comprising an upper wall, side wall, and a diagonally disposed spanning member positioned therebetween, wherein a plurality of hollow thin-walled screen frame members each with a first end and a second end receive the flanges of the screen corner key at their first and second ends joining them to orthogonally opposed adjacent screen frame members of the plurality of screen frame members to ultimately form a fully assembled screen frame, the central magnetic members of the screen corner keys configured to be positioned proximate the corner key mate thereby causing each of the magnetic corner keys of the screen frame to be magnetically attracted to and releasably attached to the corner key mates inserted in the screen channel of the window frame.

2. The kit of claim 1, wherein each of the corner key mates is encapsulated in an engineered polymer.

3. The kit of claim 1, wherein the screen corner key central magnetic members are each is encapsulated in an engineered polymer.

4. The kit of claim 1, wherein one of the corner key mates is configured to be inserted into the corner of the screen channel of the window frame.

5. The kit of claim 1, wherein the plurality of screen corner keys comprises at least four screen corner keys.

6. The kit of claim 1, wherein each of the corner key mates comprises a back wall with a height H, a length L, an upper edge, a lower edge and first and second side edges.

7. The kit of claim 6, wherein the corner key mate comprises an overhanging upper wall with opposed first and second laterally extending side edges, the upper wall extending perpendicularly outwardly a distance D1 from the upper edge of the back wall, the overhanging upper wall terminating at a first outer edge with the second side edge of the overhanging wall terminating prior to the second side edge of the back wall.

8. The kit of claim 7, wherein the corner key mate comprises a first flange with opposed first and second laterally extending side edges, the first flange extending downward perpendicularly from the first outer edge of the overhanging wall and spanning between the opposed first and second laterally extending side edges of the overhanging upper wall, the first flange extending downwardly a distance of at least 0.1 H.

9. The kit of claim 7, wherein the corner key mate comprises a side wall extending perpendicularly outwardly a distance of D1 from the second side edge of the back wall with opposed first and second laterally extending edges and terminating at an outbound edge, the second laterally extending edge of the side wall terminating prior to the upper edge of the back wall.

10. The kit of claim 9, wherein the corner key mate comprises a second flange with first and second opposed laterally extending edges, the second flange extending outward perpendicularly from the outbound edge of the back wall, the lateral extent of the second flange comprising at least 0.1 L.

11. The kit of claim 9, wherein the corner key mate comprises a spanning member between the second laterally extending side edge of the overhanging upper wall and the first laterally extending edge of the side wall forming an angle in the range of 120 to 150 degrees between the spanning member and the second laterally extending side edge of the overhanging upper wall.

12. The kit of claim 9, wherein the second laterally extending side edge of the first flange and the first laterally extending edge of the second flange comprise angles of 45 degrees relative to their respective opposed side edges.

13. The kit of claim 9, wherein the corner key mate comprises a weld flash relief gap between a second lateral edge of the first flange and the first lateral edge of the second flange.

14. A kit for magnetically attaching a window screen to a window frame, the kit comprising:

a screen corner key with a central magnetic member and two orthogonally opposed flanges extending outwardly in a single plane from the central magnetic member; and a corner key mate for insertion into a corner of a screen channel of the window frame, the corner key mate comprising an upper wall, a side wall, and a canted spanning member positioned therebetween, wherein the flanges of the screen corner key are inserted into a first and a second end of orthogonally opposed adjacent screen frame members to ultimately form a fully assembled screen frame, the central magnetic member of the inserted corner key configured to be positioned over the corner key mate thereby attracting the screen corner key to the corner key mate.

15. A magnetically attachable window screen system for attachment to a window frame, the window screen system comprising:

a plurality of screen frame members, each of the frame members comprising a first end and a second end, the first and second ends operable to receive a flange member;

a screen corner key with a central magnetic member and two orthogonally opposed flange members extending outwardly from the central magnetic member; and a corner key mate for insertion into a corner of a screen channel of the window frame the corner key mate comprising an upper wall, side wall, and a spanning member disposed therebetween;

wherein the flange members of the screen corner key are inserted into the first and second ends of orthogonally opposed adjacent screen frame members of the plurality of screen frame members to form a fully assembled screen frame, the central magnetic member of the inserted corner key operable for magnetic attraction to the respective corner key mate.

16. The magnetically attachable window screen system of claim 15, wherein the plurality of screen frame members comprises at least four screen frame members.

17. The magnetically attachable window screen system of claim 15, wherein the screen frame members are thin walled.

18. A magnetically attachable window screen system comprising:

a window comprising a window frame for removably attaching a window screen;

the window frame comprising a lower horizontal frame side, an upper horizontal frame side and two opposing vertical frame sides;

each of the window frame sides comprising a screen channel extending the entire perimeter of the window frame;

a corner key mate fitted into each corner of the screen channel the corner key mates each comprising an upper wall, side wall, and a spanning member disposed therebetween;

the window screen comprising a screen frame, the screen frame further comprised of a plurality of thin-walled screen frame members each with a first end, a second end and an open channel therein, the first end of each of the screen frame members connected to the second end of an adjacent screen frame members of the plurality of screen frame members; and a plurality of screen corner keys each with orthogonally opposed flanges extending outwardly from a central magnetic member, the first and second ends of the screen frame members configured for receiving the flanges of the screen corner keys, wherein once the screen corner keys are received into all the screen frame members the central magnetic member of the screen corner keys are disposed proximate the corner key mates and magnetically attracted thereto and held in position.

19. The system of claim 18, wherein the central magnetic member of the screen corner keys are each encapsulated in an engineered polymer.

20. The system of claim 18, wherein the corner key mates are each encapsulated in an engineered polymer.

21. The system of claim 18, wherein the central magnetic member of the screen corner keys are each comprised of a neodymium alloy.

* * * * *